Dec. 26, 1939.  R. E. GLENNY  2,184,383

EXPANSIBLE BROACH

Filed March 21, 1938

INVENTOR.
ROBERT E. GLENNY.
BY *Milburn & Milburn*
ATTORNEYS.

Patented Dec. 26, 1939

2,184,383

UNITED STATES PATENT OFFICE 2,184,383

EXPANSIBLE BROACH

Robert E. Glenny, Cleveland, Ohio, assignor of forty-nine one-hundredths to The East Shore Machine Products Company, Cleveland, Ohio Application March 21, 1938, Serial No. 197,048

3 Claims. (Cl. 29—95.1)

This invention relates to an expansible broach.

I am aware that there have been devised broaches which can be adapted for different depths of cutting, but I am not aware that there has been devised previously an expansible broach which possesses either the structure or advantages of my present form of device.

In a general way, my invention contemplates a broaching tool in which the same cutting blade can be adjusted very readily so as to vary the depth of cut without removing the blade from the tool; and this constitutes one object of my present invention.

A further object is to devise such a broaching tool in which the parts are so constructed and arranged that the tool itself will serve as a centering means with respect to the work during the broaching operation.

Another object is to devise a broaching tool which is expansible and which may have a plurality of blades, all of which can be adjusted without removing any of them from the tool.

Still another object is to provide an expansible broach which can be readily assembled and adjusted in such manner that there will be realized a great saving in time as compared with the use of prior devices, and which at the same time is of extremely simple construction and hence comparatively inexpensive.

Other objects will appear from the following description and claims when considered together with the accompanying drawing.

Figure 1:
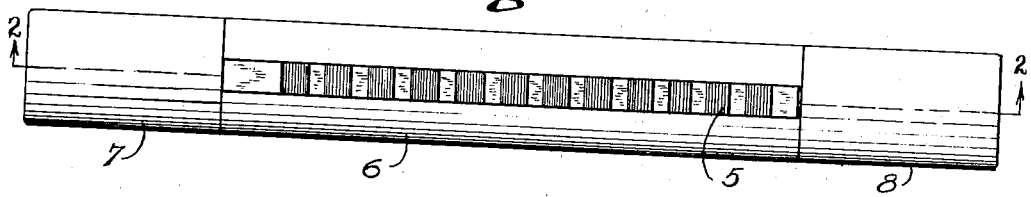
Fig. 1 is a plan view of my present improved device.
Figure 2:
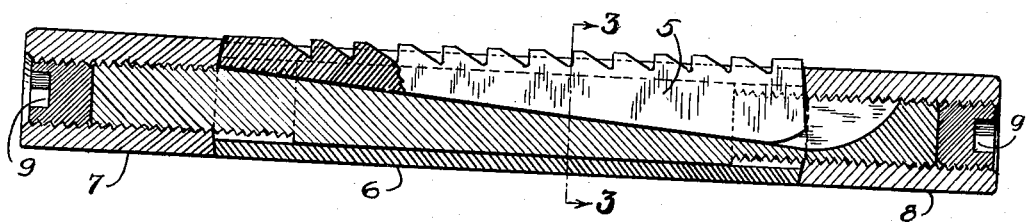
Fig. 2 is a view taken on line 2—2 of Fig. 1.
Figure 3:
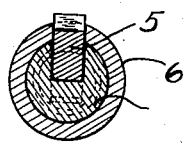
Fig. 3 is a view taken on line 3—3 of Fig. 2.
Figure 4:
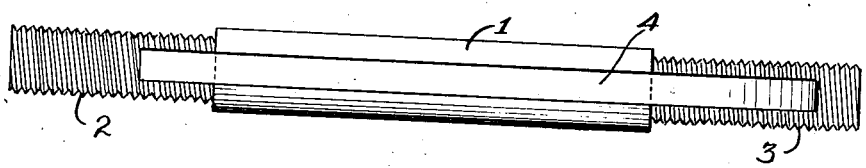
Fig. 4 is a plan view of the main body member itself.

It is to be understood that the present form of disclosure is merely for purposes of illustration and that there may be devised various other forms and modifications without departing from the spirit of the invention as herein set forth and claimed, and that the claims hereof are to be interpreted accordingly.

Referring to the accompanying drawing, the main body of the device has the middle portion 1 and the screw-threaded end portions 2 and 3, and is provided with a longitudinally inclined slot 4 extending axially thereof, this slot being adapted to receive the blade 5. The split sleeve 6 is slid onto the middle part 1 of the main body so as to surround the same and having the cutting edge of the blade extend therethrough. As will be noted, the width of the slot corresponds with the width of the lower part of the blade; and the width of the slot in the sleeve is approximately the same so as to effectively engage the sides of the blade and serve as a guide therefor. The duplicate nuts 7 and 8 are applied to the threaded ends of the main body and are adapted to have locking engagement with the adjacent ends of the sleeves and blade members. For this purpose, I have beveled the engaging ends of these three members, as indicated in the drawing, the angle of bevel on these three members being the same. Furthermore, this provision will prevent any accidental dislodgement of the blade member, as will be understood.

Figure 5:
Fig. 5 shows a substitute form of nut, broken away.

As a means of further locking the nuts 7 and 8 in set position, I have provided the threaded plugs 9 which are located within the ends of the nuts and are adapted to engage the ends of the main body member. Any other means may be employed for this purpose. Plugs 9 serve also to protect the threaded ends of the broach body member and also the threads of the nuts and to keep the same free of chips, etc., or from other injury. As an alternative form, the nuts may be formed with closed or blind ends as an integral part thereof, as seen in Fig. 5, for the same purpose of protection, and the nuts may be knurled for easier turning, as indicated.

Assuming that the parts of the device have been assembled so as to have the blade member occupy the position indicated in the present drawing, the complete assembly can be applied as a unit to any turret lathe, engine lathe or arbor press for actual use. When it is desired to expand the broach radially, this can be done by merely loosening nut 7 in the present illustration to the extent desired, then moving the blade up the inclined slot 4 so as to engage the nut 7, and then tightening the nut 8 so as to again lock the parts in the new position. In case the auxiliary locking means 9 should be employed, they too will of course be released and later tightened, as will be understood.

As will be seen, such adjustment of the blade up the inclined slot will produce a radial expansion of the broach so far as the effectiveness of the cutting blade is concerned.

There may be marked upon the nut and sleeve a scale to indicate accurately the extent of adjustment of the nut 7, so as to thereby be able to gauge exactly the amount of adjustment of the blade member.

Thus the desired adjustment of the blade, in the present form of device, can be obtained without removing it from the body of the device, and the adjustment can be effected very easily and very quickly.

The sleeve 6 serves not only to brace and guide the blade 5 in the assembly, but by having the sleeve and nuts flush with each other, there is afforded a means for centering the tool within the opening in which the keyway is being cut. It is to be noted also that, regardless of the position of the blade, the nuts 7 and 8 can always be engaged in the same manner with the sleeve 6; that is, the nuts and sleeve are always flush with each other, the blade merely protruding more or less through the slot in the sleeve. Thus the sleeve 6 may be regarded as a follower since its position longitudinally will vary according to that of the blade but without changing its manner of engagement with the nuts. Accordingly, the sleeve 6 is to be regarded as an important part of my present assembly, with due consideration to its manner of co-operation with the other parts of the device, as herein explained.

Instead of the form of blade here illustrated, there may be substituted any other desired form of blade, and the key-way may be formed at any desired angle by employing a blade that has its cutting portion formed in the proper manner.

Also, my invention may be embodied in a device in which a plurality of blades are provided for cutting simultaneously a plurality of keyways. That is to say, the blades will be located in individual slots spaced about the longitudinal axis of the main body of the tool. And in such case, the sleeve means will comprise a plurality of arcuate sections instead of a single form of sleeve. When the parts of such multiple form of device are assembled, we have the equivalent of a sleeve with a plurality of slots, one for each blade. Otherwise, the device is the same as that above described and the parts function in the same manner and with the same advantages as already noted and as to be now further explained.

Thus, with my device I can produce double, offset or spline keyways of various shapes and all with the same device which can be readily modified and adjusted, as will be understood from the above.

This device is of simple but sturdy construction; it can be manufactured and sold at comparatively low cost so as to recommend itself to both small and large shops; it can be set originally and later adjusted very easily and very quickly and without disassembling the parts, which means a great saving in time and hence speeding up of production; it can be readily adapted for producing single or multiple keyways varying in form; and thus I have produced a broach by which there may be realized increased quantity production at decreased cost and without any sacrifice in quality.

What I claim is:

1. An expansible broach comprising a cylindrical body member having screw-threaded end portions and longitudinally inclined axially extending slot means, broaching blade means having corresponding bottom inclination for adjustable engagement within said inclined slot means, cylindrical split sleeve means engaged about said body member so that the blade means will extend therethrough, and cylindrical nuts on the ends of said body member, said body member, sleeve and nuts being co-axially disposed, said nuts having locking engagement with the ends of the sleeve means and blade means and being flush with said sleeve means.

2. An expansible broach comprising a cylindrical body member having screw-threaded end portions and a longitudinally inclined axially extending slot, a broaching blade having its bottom inclined and in adjustable engagement within said inclined slot, a single cylindrical split sleeve engaged about said body member so that the blade extends through the slot therein, and cylindrical nuts on the ends of said body member, said body member, sleeve and nuts being co-axially disposed, said nuts being flush with said sleeve, and the adjacent ends of said nuts, sleeve and blade being beveled for locking engagement of the nuts with the sleeve and blade.

3. An expansible broach comprising a cylindrical body member having screw-threaded end portions and longitudinally inclined axially extending slot means, broaching blade means having corresponding bottom inclination for adjustable engagement within said inclined slot means, cylindrical split sleeve means engaged about said body member so that the blade means will extend therethrough, and cylindrical nuts on the ends of said body member, said body member, sleeve and nuts being co-axially disposed, said nuts having locking engagement with the ends of the sleeve means and blade means and being flush with said sleeve means, and means for closing the outer ends of said nuts.

ROBERT E. GLENNY.